United States Patent

Eckert et al.

[15] 3,690,588

[45] Sept. 12, 1972

[54] TENSION CONTROLLING MEANS FOR MAGNETIC TAPE OR THE LIKE

[72] Inventors: Hans Eckert; Uwe Ehms, both of Nuernberg, Germany

[73] Assignee: Grundig E.M.V. Elektro-Mechanische Versuchsanstalt Inhaber Max Grundig, Fuerth/Bayern, Germany

[22] Filed: Dec. 3, 1970

[21] Appl. No.: 94,912

[30] Foreign Application Priority Data

Dec. 19, 1969 Germany..........P 19 63 613.6

[52] U.S. Cl....................................242/189, 242/204

[51] Int. Cl.......B65h 59/38, B65h 63/02, G03b 1/04

[58] Field of Search....................242/75.43, 189, 204

[56] References Cited

UNITED STATES PATENTS 2,911,162 11/1959 Kyle, Jr..................242/204 X

*Primary Examiner*—Leonard D. Christian

*Attorney*—Michael S. Striker

[57] ABSTRACT

A tape recorder wherein the supply reel is braked with a weaker force during transport of magnetic tape at a normal speed so that the braking action varies as a function of changes in tension of the tape. The supply reel is subjected to a stronger braking action in response to termination of rapid forward transport or rapid rewinding of tape to thus prevent spillage and/or looping of tape due to inertia of the supply reel. The stronger braking action is produced by a regulating device having two torsion springs one of which assists that spring which serves to tension a band brake for the supply reel upon termination of rapid rewinding of tape onto the supply reel and the other of which assists that spring which serves to tension a band brake for the supply reel upon completion of rapid forward transport of the tape toward the takeup reel. That reel which constitutes the supply reel during forward transport of tape becomes the takeup reel during rewinding, and vice versa.

15 Claims, 5 Drawing Figures

Inventor:
HANS ECKERT
UWE EHMS
By Michael S. Striker
Attorney

Inventor:

HANS ECKERT
UWE EHMS

By [illegible]
Attorney

PATENTED SEP 12 1972 3,690,588

SHEET 3 OF 3

Inventor:
HANS ECKERT
UWE EHMS
By: [illegible]
Atty

TENSION CONTROLLING MEANS FOR MAGNETIC TAPE OR THE LIKE

BACKGROUND OF THE INVENTION

The present invention relates to sound recording and/or reproducing apparatus in general, and more particularly to improvements in apparatus (hereinafter called tape recorders for short) wherein a magnetic tape or an analogous carrier of information is convoluted on the cores of two spools or reels one of which pays out the tape when the tape is being collected by the other reel, and vice versa. Still more particularly, the invention relates to improvements in devices for regulating the tension of tape in tape recorders of the type wherein the tape can be transported at several speeds.

It is already known to provide a tape recorder with braking devices which serve to act upon the supply reel, namely, on that reel which is caused to pay out the tape while the other reel is driven to collect the tape on its core. Such braking devices are necessary in order to prevent spilling of tape, for example, in response to stoppage of the takeup reel while the supply reel continues to rotate and to pay out the tape due to inertia. In many presently known tape recorders, the braking devices comprise two levers which engage that portion of the tape which extends between the reels and serve to tension a cord or band which is thereby held in requisite frictional engagement with the respective reel. As a rule, the braking action is variable and depends on the extent of contact between the tape and a feeler on the respective lever. The extent of such contact varies as a function of the diameter of that portion of tape which is convoluted on the core of the respective reel. This insures that the braking action is commensurate with the inertia of the corresponding reel.

It was found that braking devices of the just outlined character are quite satisfactory in tape recorders wherein the dimensions of the supply reel equal the dimensions of the takeup reel. For example, if the tape recorder uses two reels each having a diameter of 6 inches, the braking devices will prevent the formation of loose loops due to spillage of magnetic tape under all operating conditions, i.e., also immediately upon completion of rapid rewinding or fast forward transport of the tape. One of the braking devices is always held in an inoperative position, i.e., one of the braking devices is idle during rewinding and the other braking device is idle during forward transport of the tape. This is due to the fact that a braking force must be applied only to that reel which pays out the tape, i.e., to the reel which constitutes the supply reel. It will be understood that the reel which constitutes the supply reel and is braked during forward transport of the tape becomes the takeup reel and should not be braked when the tape is transported in reverse during rewinding.

In order to avoid spillage and looping of tape between the two reels, certain tape recorders which are provided with the aforedescribed conventional braking devices carry prominently displayed instructions that the apparatus should be used with two reels of identical diameter. Such instructions are necessary because, once the diameter of one reel is substantially larger or smaller than the diameter of the other reel (e.g., if the tape recorder employs a reel with a diameter of 18 centimeters and a reel having a diameter of 13 centimeters), the conventional braking devices are unable to prevent the formation of loose loops. It was found that, when the tape recorder employs two identical reels, the braking ratio must be at least 1:2.5. This means that the braking force acting on the supply reel must be a multiple (2.5 times) of the braking force which acts on the takeup reel. The aforementioned ratio must be increased to at least 1:6 if the tape recorder uses reels of different diameters (for example, 18 and 13 centimeters); this insures that the tape will be subjected to requisite tension during the interval immediately following termination of rapid rewinding or rapid transport in a forward direction. The generation of such braking forces by conventional means necessitates the use of bulky, complicated and costly braking devices.

SUMMARY OF THE INVENTION

An object of the invention is to provide a tape recorder with novel and improved tape tension controlling means which are relatively simple, compact and inexpensive but are fully capable of preventing spillage of tape under any and all operating conditions including such situations when the tape recorder employs reels whose diameters are substantially different from each other.

Another object of the invention is to provide the tape recorder with one or more braking devices whose operation is automatic so that such braking devices can terminate, start and change the braking action in automatic response to changes in operating conditions.

A further object of the invention is to provide a braking device which is just as reliable when the tape recorder employs a pair of identical reels as when one of the reels is substantially larger or substantially smaller than the other reel.

The invention is embodied in a sound recording and/or reproducing apparatus which comprises a first and second reel, a tape or an anlogous carrier of information having ends connected with and portions convoluted on the reels so that one of the reels pays out the tape when the other reel is rotated in a direction to collect the tape, drive means for rotating at least the other reel at a plurality of speeds including a higher speed and a lower speed, adjustable braking means provided at least for the one reel, and regulating means for adjusting the braking means in response to termination of rotation of the other reel at one of the speeds.

The braking means is adjustable to apply to the one reel a stronger or weaker braking force during normal operation whereby the braking force varies proportionally with changes in the tension of tape. The regulating means is arranged to adjust the braking means to apply to the one reel a stronger braking force in response to termination of rotation of the other reel at the higher speed. This prevents spillage of tape and the formation of loose loops between the two reels upon completion of rapid rewinding or rapid forward transport of the tape.

The novel features which are considered as characteristic of the invention are set forth in particular in the appended claims. The improved tape recorder itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figures 1, 1A:
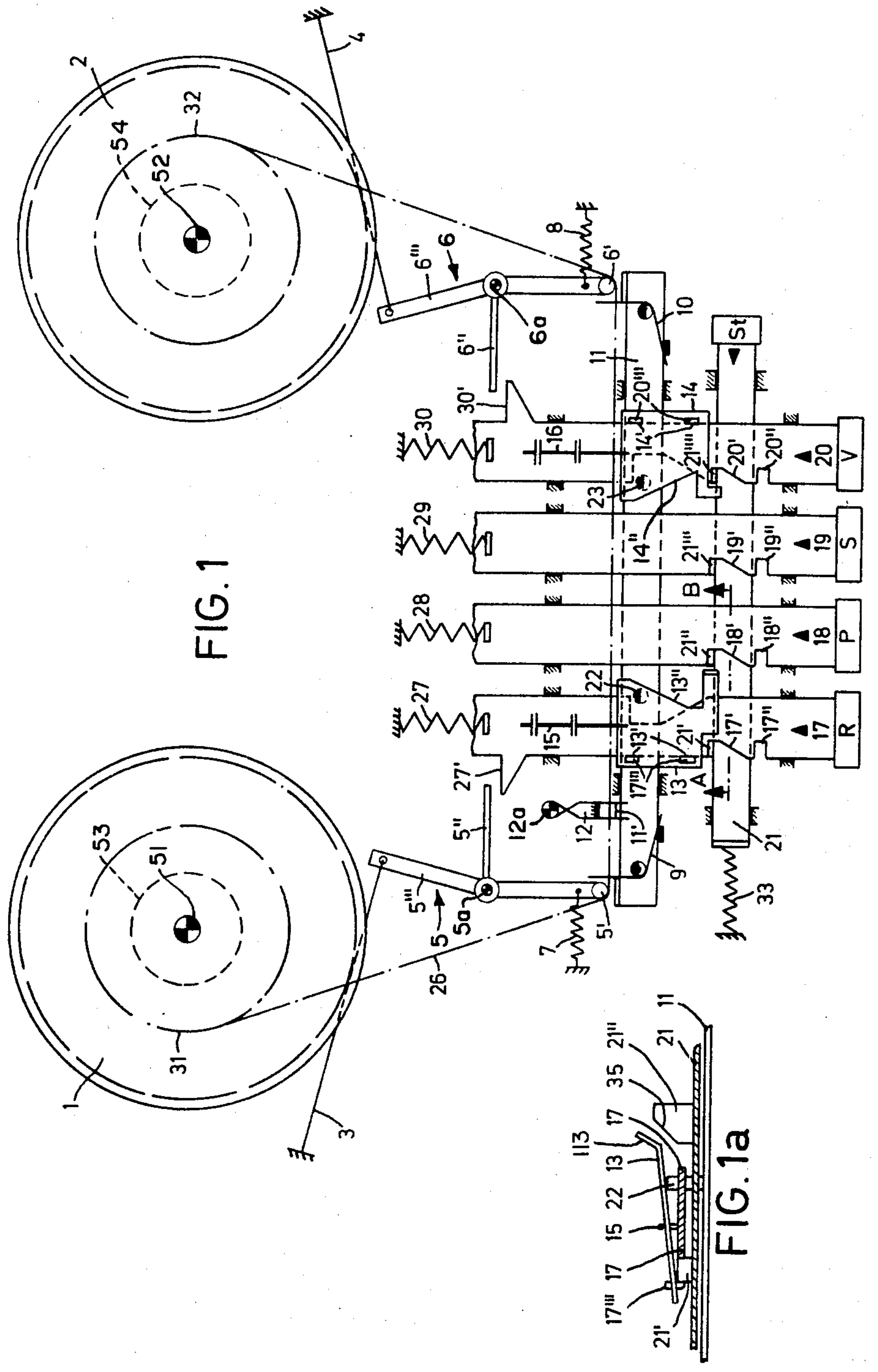
FIG. 1 is a diagrammatic plan view of a portion of a tape recorder including two braking devices whose braking action can be regulated in accordance with the present invention, the parts of the tape recorder being shown in positions they assume upon completion of a sound recording or sound reproducing operation.
FIG. 1*a* is an enlarged sectional view as seen in the direction of arrows from the line A–B of FIG. 1.

Referring first to FIG. 1, there is shown a portion of a tape recorder having a pair of reels 1, 2 whose cores are connected to the respective ends of a magnetic tape 26. These reels are mounted on the deck (not shown) forming part of the frame or housing of the tape recorder. The housing further contains other customary components of the tape recorder which are mounted in part above and in part below the tape deck. The reels 1, 2 are readily accessible to the operator, together with five actuating members here shown as pushbuttons or knobs and denoted by the reference characters R, P, S, V and St.

The pushbutton R is connected with a reciprocable slide 17 and can be depressed against the opposition of a helical spring 27 which reacts against the housing of the tape recorder. The purpose of the pushbutton R is to effect rapid rewinding of the tape 26 from one of the reels 1, 2 onto the other reel. The pushbutton P serves to stop the transport of tape while the motor (not shown) which drives the takeup reel continues to run and while the amplifier (not shown) remains in operation. This pushbutton is rigid with a second slide 18 which is movable from the position shown in FIG. 1 against the opposition of a spring 28. Depression of the pushbutton P causes the customary elastic presser roll to move away from the capstan and to thus interrupt the forward transport of tape 26. The pushbutton S initiates the forward transport of tape 26 at a normal speed and is connected with a third slide 19 which can be shifted upwardly, as viewed in FIG. 1, against the opposition of a helical spring 29. The pushbutton V initiates the rapid or fast forward movement of the tape 26 and is connected with a slide 20 which can be shifted from the position shown in FIG. 1 against the opposition of a helical spring 30.

Figures 2, 2A:
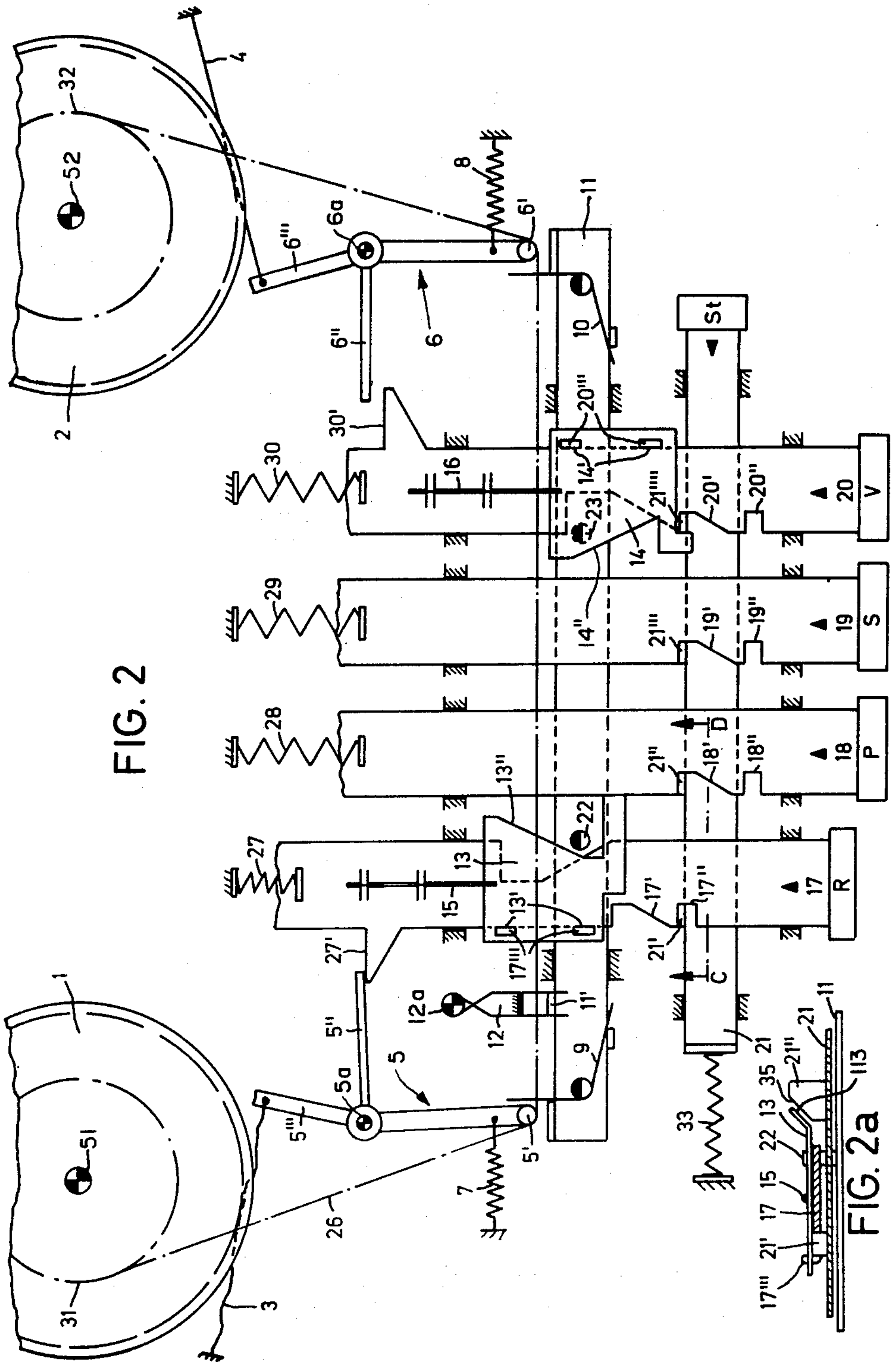
FIG. 2 is an enlarged plan view similar to that of FIG. 1 but showing the parts in positions they assume during rapid rewinding of tape.
FIG. 2*a* is a sectional view as seen in the direction of arrows from the line C–D of FIG. 2.

Each of the slides 17–20 is provided with two recesses or notches 17′—17″, 18′—18″, 19′—19″, 20′—20″ which can receive adjacent projections 21′, 21″, 21‴, 21⁗ of a reciprocable detent member 21 which is biased in a direction to the right, as viewed in FIG. 1, by a helical spring 33 and is connected with the pushbutton St. The detent member 21 is reciprocable in suitable bearings provided in the housing of the tape recorder to guide the member 21 at right angles to the direction of reciprocatory movement of the slides 17–20. When the pushbutton R is depressed to move upwardly, as viewed in FIG. 1, the projection 21′ slides along an inclined cam face which flanks a portion of the notch 17′ so that the detent member 21 is shifted in a direction to the left whereupon the projection 21′ snaps into the notch 17″ under the action of the spring 33 to hold the pushbutton R and its slide 17 in depressed or operative positions (see FIG. 2). When the operator thereupon depresses another pushbutton, for example, the pushbutton P, the projection 21″ slides along the inclined cam face which flanks the notch 18′ and causes the detent member 21 to move in a direction to the left so that the projection 21′ is withdrawn from the notch 17″ and the spring 27 is free to return the slide 17 and the pushbutton R to the positions shown in FIG. 1. The projection 21″ thereupon snaps into the notch 18″ under the action of the spring 33 and holds the pushbutton P and its slide 18 in the depressed positions. The same applies for the pushbuttons S and V. The operator can release the depressed pushbutton R, P, S or V by pressing against the pushbutton St which shifts the detent member 21 against the opposition of the spring 33 so that the projection 21′, 21″, 21‴ or 21⁗ can leave the respective notch 17″, 18″, 19″ or 20″.

The improved means for regulating the braking action upon the supply reel subsequent to return movement of the pushbutton R or V to the position of FIG. 1 comprises two pivotable shifting members 13, 14 which are respectively coupled to the slides 17 and 20. The shifting member 13 is a flap or leaf which is formed with two aligned slots 13′ for reception of lugs 17‴ provided on the slide 17. The slots 13′ and lugs 17‴ together form a simple hinge enabling the flap 13 to pivot about an axis which is parallel to the direction of movement of the slide 17. The hinge for the shifting member of flap 14 comprises two slots 14′ in the flap and two lugs 20‴ provided on the slide 20 and each extending into one of the slots 14′. A bar spring 15 is attached to the inner portion of the slide 17 and its free end overlies the flap 13 to bias the latter against the adjacent side of the slide 17. A similar bar spring 16 is mounted on the slide 20 and bears against the front side of the flap 14, as viewed in FIG. 1. With reference to FIG. 1*a*, the bar spring 15 biases the flap 13 in a clockwise direction whereby the flap abuts against a pin-shaped follower 22 provided on the upper side of a reciprocable tensioning rail or carrier 11 which forms part of the novel regulating means. The flap 13 overlaps the follower 22 when the corresponding slide 17 is held in the extended or inoperative position of FIG. 1. A similar pin-shaped follower 23 is provided on the rail 11 for the flap 14 on the slide 20. The flap 14 is biased against the follower 23 by the bar spring 16 when the slide 20 dwells in its extended or inoperative position. The rail 11 is normally held in the neutral position of FIG. 1 by a torsion spring 12 which is convoluted around a fixed post **12*a* provided in the housing of the tape recorder. The legs of the torsion spring 12 flank a projection or lug 11′ of the rail 11**.

The braking means for the reels 1, 2 comprises two three-armed levers 5 and 6. The lever 5 is pivotable in the housing on a fixed shaft 5a and has a first arm 5′ provided with a scanning portion or feeler which engages the magnetic tape 26. The lever 5 is biased in a clockwise direction, as viewed in FIG. 1, by a helical spring 7 so that the feeler of the arm 5′ bears against the inner side of the tape. A second arm 5‴ of the lever 5 is connected with one end of a braking element here shown as a cord or cable 3 which is convoluted around a portion of the reel 1 and the other end of which is anchored in the housing of the tape recorder. The cord or cable 3 (hereinafter called cord) forms one complete convolution around the adjacent portion of the reel 1. A third arm 5″ of the lever 5 extends into the path of movement of a laterally extending protuberance or tooth 27′ of the slide 17. When the pushbutton R is depressed, the tooth 27′ pivots the lever 5 against the opposition of the spring 7 so that the feeler on the arm 5′ is disengaged from the tape 26 and the tension of the cord 3 is relaxed, i.e., the braking device for the reel 1 becomes inoperative. During normal operation of the tape recorder, namely, during recording or playback, the feeler on the arm 5′ engages the tape 26 and regulates the braking action of the cord 3 in response to changes in tension of the tape so that such tension remains substantially constant. As shown in FIG. 1, when the tension of tape 26 increases, the lever 5 is biased in a counterclockwise direction and the arm 5‴ loosens the cord 3 so that the braking action decreases with attendant reduction in tensioning of the tape 26. When the tension of the tape 26 decreases, the spring 7 contracts and the cord 3 produces a stronger braking action whereby the tension of the tape 26 increases.

The lever 6 of the braking device for the reel 2 comprises three arms 6′, 6″, 6‴ which are analogous to the similarly referenced arms of the lever 5. The arm 6‴ is connected with one end of a braking element or cord 4 which is convoluted around a portion of the reel 2. The arm 6″ can be engaged by a protuberance or tooth 30′ on the slide 20 to disengage the feeler on the arm 6′ from the tape 26 when the pushbutton V is depressed. The lever 6 is pivotable on a fixed shaft 6a and is biased in a counterclockwise direction, as viewed in FIG. 1, by a helical spring 8. The two braking devices 3,5,7 and 4,6,8 are mirror symmetrical to each other with reference to a vertical plane extending between the reels 1 and 2.

Figure 3:
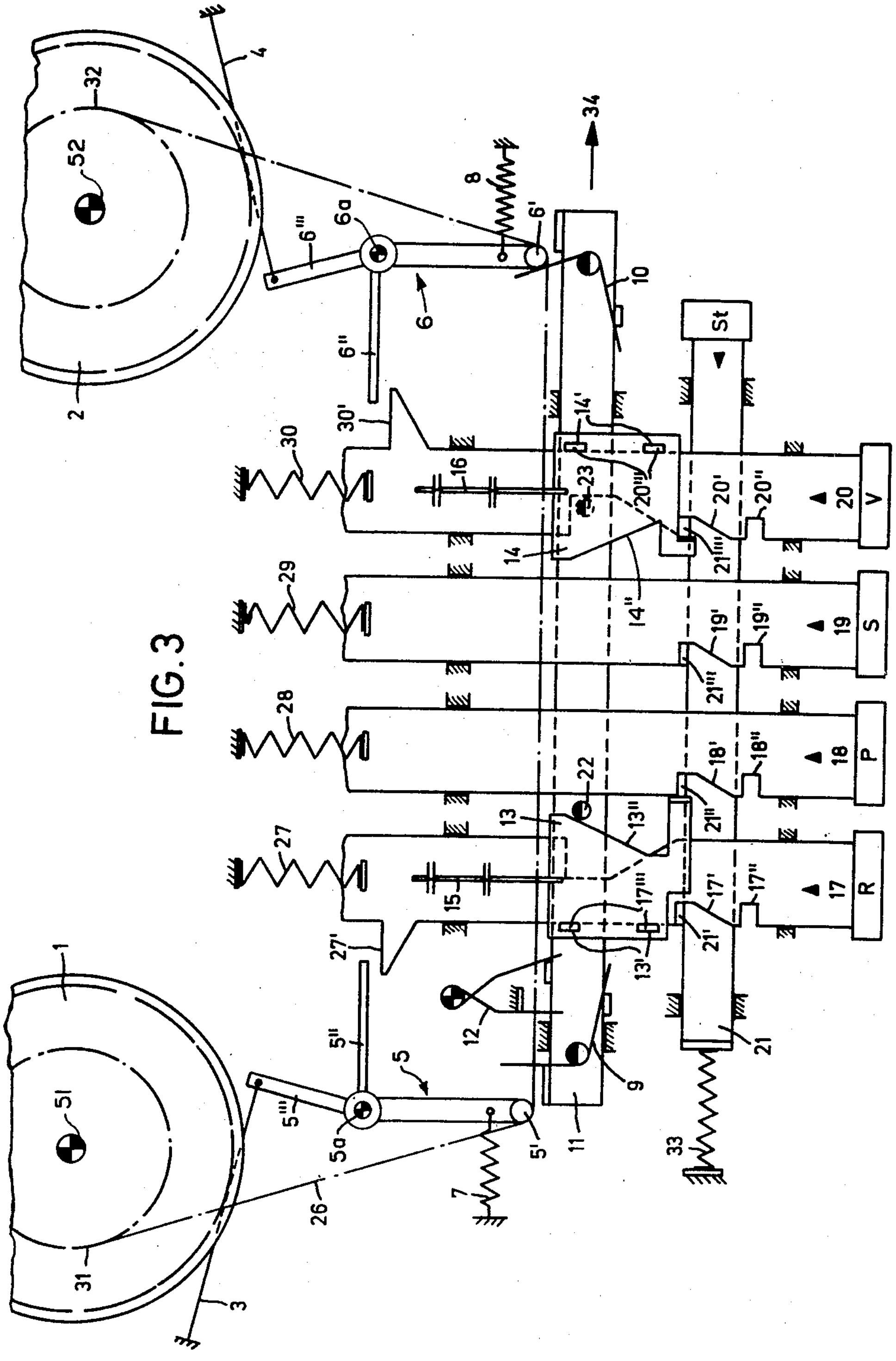
FIG. 3 illustrates the parts of the tape in positions they assume upon completion of the rewinding operation.

The rail 11 carries two elastic portions here shown as torsion springs 9 and 10 which can respectively assist the springs 7 and 8 to augment the braking action of the cords 3, 4, respectively. As will be readily understood by comparing FIGS. 2 and 3, an inclined cam face 13″ on the flap 13 can shift the follower 22 (and hence the rail 11) in a direction to the right, as viewed in FIG. 2, to a first operative position when the pushbutton R is permitted to return to the position shown in FIG. 3, i.e., when the drive for the reel 1 is arrested. The upwardly extending leg of the torsion spring 10 then engages the feeler on the arm 6′ of the lever 6 and pivots the lever 6 in a counterclockwise direction to assist the spring 8 and to thus subject the cord 4 to an increased tension, i.e., the reel 2 is subjected to the action of a stronger braking force to prevent the formation of loops when the driving connection between the reel 1 and the motor of the tape recorder is terminated.

Analogously, when the pushbutton V is permitted to move from its depressed to its extended or inoperative position, the inclined cam face 14″ on the flap 14 causes the follower 23 to move the rail 11 in a direction to the left to a second operative position whereby the upwardly extending arm of the torsion spring 9 engages the feeler on the arm 5′ and pivots the lever 5 in a clockwise direction to assist the action of the spring 7. This results in tensioning of the cord 3 which subjects the reel 1 to a more pronounced braking action.

The numerals 51 and 52 denote fixed posts which rotatably support the reels 1 and 2. The drive means which can rotate the reel 1 at several speeds is indicated by the dotted-line circle 53. Such drive means is respectively started and arrested in response to movement of the slide 17 to the first position shown in FIG. 2 and the second position shown in FIG. 1 or 3. The variable-speed drive means for the reel 2 is indicated symbolically by a broken-line circle 54. Such drive means is respectively started and arrested in response to movement of the slide 20 from and to the position shown in FIG 1. The drive means 53 can be operated at a desired speed when the drive means 54 is idle, and vice versa.

OPERATION

FIG. 1 illustrates the parts of the tape recorder in their neutral positions. The parts assume such positions in response to depression of the pushbutton St which enables the previously depressed pushbutton R,P,S or V to return to its extended position. It is assumed that depression of the pushbutton St resulted in release of the pushbutton S. The flaps 13, 14 respectively overlie the followers 22,23 and are biased thereagainst by the relatively weak bar springs 15, 16. Therefore, the torsion spring 12 is free to maintain the rail 11 in the neutral position in which the torsion springs 9, 10 are respectively disengaged from the feelers on the arms 5′, 6′. The spring 12 cannot turn on the post 12a so that one of its legs is deformed and stores energy whenever the rail 11 is caused to leave the position shown in FIG. 1.

If the operator thereupon decides to depress the rapid rewind pushbutton R (see FIG. 2), the slide 17 stresses the spring 27 and the inclined cam face in its notch 17′ shifts the projection 21′ of the detent member 21 against the opposition of the spring 33 until the projection 21′ snaps into the notch 17″. The flap 13 simply slides along the top of and beyond the follower 22 without causing any lengthwise displacement of the rail 11. However, the flap 13 is free to pivot in a clockwise direction (compare FIGS. 1a and 2a) as soon as its cam face 13″ moves beyond the follower 22. Such pivotal movement of the flap 13 is caused by the bar spring 15.

Depression of the pushbutton R and slide 17 triggers several operations. Thus, the friction wheels (not shown) which serve to effect rapid rotation of the reel 1 in a clockwise direction (so that the reel 1 collects the tape 26) are moved to operative positions. The reel 1 collects the tape which is being paid out by the reel 2 whereby the cord 4 brakes the reel 2 to insure that the non-convoluted portion of the tape 26 is maintained under requisite tension. The rapid rewinding operation is completed in response to depression of the pushbutton St which expels the lug 21' from the notch 17'' so that the spring 27 returns the slide 17 and the pushbutton R to the positions shown in FIG. 3. Such return movement of the pushbutton R initiates an intensified braking action upon the reel 2 in the following way:

The cam face 13'' of the flap 13 (which shares the outward movement of the slide 17) engages the follower 22 and shifts the rail 11 in a direction to the right (arrow 34) whereby the projection 11' deforms the right-hand leg of the torsion spring 12 and the upper arm of the torsion spring 10 bears against the feeler on the arm 6' of the braking lever 6. Thus, the spring 10 assists the spring 8 to subject the cord 4 to a suddenly increased tension and to subject the reel 2 to a stronger braking action. This prevents the reel 2 from paying out the tape 26 at a rate which exceeds the rate at which the tape can be collected by the reel 1 while the latter is being decelerated to zero speed. The convoluted portions of the tape 26 on reels 1 and 2 are respectively shown at 31 and 32. Thus, the tape 26 cannot form loose loops in the space between the reels 1 and 2. The extent of lengthwise movement of the rail 11 in response to engagement between the follower 22 and cam face 13'' (while the slide 17 moves under the action of the spring 27) is selected in such a way that the free arm of the torsion spring 10 undergoes substantial deformation and enables the lever 6 to produce a strong braking action, namely, a braking action which is much higher than the action due to the bias of the spring 8. Such pronounced braking action is sufficient to establish between the reels 1 and 2 a braking ratio of about 1:6 which is ample to avoid the formation of loose loops even if the diameter of one of the reels 1,2 differs substantially from the diameter of the other reel. It will be noted that the auxiliary of supplemental braking action is applied to that reel (the reel 2 in FIG. 3) which pays out the tape 26.

The detent member 21 has two lifting cams or ramps 35, one for each of the flaps 13, 14. The ramp 35 for the flap 13 is shown in FIGS. **1*a* and 2*a*. When the operator depresses any one of the pushbuttons R,P,S,V,St while the rail 11 dwells in the right-hand end position shown in FIG. 3, the cam 35 of the detent member 21 moves against a suitably inclined portion 113 of the flap 13 and pivots the flap in a counterclockwise direction, as viewed in FIG. 2*a*, so that the cam face 13'' is disengaged from the follower 22 and the spring 12 is free to return the rail 11 to the neutral position of FIG. 1. Such movement of the rail 11 causes the follower 22 to move to a position in which it is overlapped by the flap 13 which bears against the tip of the follower 22 under the action of the bar spring 15. As shown in FIG. 1*a*, the ramp 35 can form an integral part of the projection 21''**.

The torsion spring 10 becomes disengaged from the feeler on the arm 6' of the braking lever 6 while the rail 11 moves back to the neutral position of FIG. 1 whereby the braking action upon the reel 2 decreases because the cord 4 is tensioned only by the spring 8.

The braking action of the lever 5 for the reel 1 is augmented by the spring 9 in response to return movement of the pushbutton V to the extended position. Thus, in order to move the spring 9 into engagement with the feeler on the arm 5', the operator must depress the pushbutton V so that the reel 2 collects tape which is being paid out by the reel 1, and the operator must thereupon cause the pushbutton V to return to its extended position. This causes the cam face 14'' of the flap 14 to move the rail 11 to the left, as viewed in FIG. 1, whereby the free arm of the spring 9 bears against the feeler on the arm 5'. That portion of the regulating means which includes the flap 14 is mirror symmetrical to the aforedescribed portion including the flap 13. As stated above, the feelers on the arms 5', 6' are respectively disengaged from the tape 26 and cease to tension the cords 3,4 as soon as the operator respectively depresses the pushbuttons R and V. This reduces the wear on the brakes and enables the takeup reel to rotate at a very high speed during those stages of operation (namely, fast rewinding and fast forward) which are respectively initiated by the pushbuttons R and V. The ramp which pivots the flap 14 (i.e., the cam which corresponds to the ramp 35 of FIGS. 1a and 2a) is preferably provided on the projection 21''''.

An important advantage of the improved tape recorder is that the operation of its braking devices is independent of the position or orientation of the reels. Thus, the braking action of cords 3,4 can be changed while the reels of the tape recorder are held in a horizontal, vertical or other plane.

Moreover, the bias of the springs 7–8, 9–10 and the extent of lengthwise movement of the tensioning rail 11 can be readily adjusted and selected in such a way that the braking devices produce an optimum braking action when the feelers on the lever arms 5', 6' are biased by the springs 7, 8 alone or by the spring 7 or 8 in conjunction with the spring 9 or 10. This insures that the tape 26 is not subjected to excessive tensional stresses. Still another advantage of the improved tape recorder is that the length of intervals required for complete stoppage of the supply reel upon completion of rapid rewinding or rapid forward transport of tape is extremely short. Such rapid stoppage can be achieved without any spillage of tape.

It is further clear that the improved regulating means and other parts of the tape recorder can be modified in a number of ways without departing from the spirit of the invention. For example, the cords 3,4 can be replaced by bands or jaws and the tape recorder may be provided with additional actuating elements, e.g., with knobs for ejection of reels. Also, the ramps for the flaps 13, 14 need not necessarily be mounted on the detent member 21.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended.

1. In a sound recording and/or reproducing apparatus, a combination comprising a first and a second reel; a tape having ends connected with and portions convoluted on said reels so that the tape is paid out by one of the reels when the other reel is rotated in a direction to collect the tape; drive means for rotating said other reel at a plurality of speeds including a higher speed and a lower speed; adjustable tape tension controlling braking means for said one reel, said braking means being arranged to normally produce a braking action which varies proportionally with changes in the tension of tape between said reels and comprising scanning means normally engaging the tape between said reels and being respectively arranged to move in first and second directions in response to decreasing and increasing tension of the tape, and at least one braking element respectively movable into stronger and weaker braking engagement with said one reel in response to movement of said scanning means in said first and second directions; and regulating means for adjusting said braking means in response to termination of rotation of said other reel at said higher speed so that said braking means then subjects said one reel to a braking action substantially exceeding said normally produced braking action to thus prevent slackening of tape between said reels due to inertia of said one reel.

2. A combination as defined in claim 1, wherein said regulating means comprises means for moving said scanning means in said second direction in response to termination of rotation of said other reel at said higher speed.

3. A combination as defined in claim 1, further comprising means for starting said drive means at said higher speed and for simultaneously at least reducing said normally produced braking action, and means for arresting said drive means.

4. In a sound recording and/or reproducing apparatus, a combination comprising a first and a second reel; a tape having ends connected with and portions convoluted on said reels so that the tape is paid out by one of the reels when the other reel is rotated in a direction to collect the tape; drive means for rotating said other reel at a plurality of speeds including a higher speed and a lower speed; adjustable tape tension controlling braking means for said one reel, said braking means being arranged to normally produce a braking action which varies proportionally with changes in the tension of the tape between said reels and said braking means comprising movable scanning means engaging the tape between said reels, biasing means for urging said scanning means against the tape, and at least one adjustable braking element movable into stronger and weaker frictional engagement with said one reel in response to movements of said scanning means under and against the action of said biasing means; and regulating means for adjusting said braking means in response to termination of rotation of said other reel at one of said speeds, said regulating means being arranged to apply to the one reel a stronger braking force in response to termination of rotation of said other reel at said higher speed and comprising tensioning means arranged to assist said biasing means in response to termination of rotation of said other reel at said higher speed.

5. A combination as defined in claim 4, wherein said tensioning means is movable to and from an operative position in which it assists said biasing means and further comprising actuating means movable between first and second positions to thereby respectively start and arrest said drive means and shifting means for moving said tensioning means to said operative position in response to movement of said actuating means from said first to said second position.

6. A combination as defined in claim 5, wherein said actuating means comprises a reciprocable slide which is movable by hand to said first position thereof and further comprising detent means for releasably holding said slide in said first position and means for disengaging said detent means from said slide so that the latter is free to move toward said second position.

7. A combination as defined in claim 6, wherein said detent means is reciprocable into and from engagement with said slide and further comprising a first pushbutton actuatable to move said slide to said first position, said means for moving the detent means from engagement with said slide comprising a second pushbutton.

8. A combination as defined in claim 7, further comprising means for biasing said slide to said second position and means for biasing said detent means into engagement with said slide.

9. A combination as defined in claim 6, wherein said tensioning means comprises a member which is reciprocable transversely of said slide.

10. In a sound recording and/or reproducing apparatus, a combination comprising a first and a second reel; a tape having ends connected with and portions convoluted on said reels so that the tape is paid out by one of the reels when the other reel is rotated in a direction to collect the tape; first drive means for rotating said other reel at a plurality of speeds including a higher speed and a lower speed; first adjustable tape tension controlling braking means for said one reel, said braking means being arranged to normally produce a braking action which varies proportionally with changes in the tension of the tape between said reels; regulating means for adjusting said braking means in response to termination of rotation of said other reel at one of said speeds, said regulating means being arranged to apply to the one reel a stronger braking force in response to termination of rotation of said other reel at said higher speed; second drive means for rotating said one reel in a direction to collect the tape at a plurality of speeds including a higher speed and a lower speed; and second braking means adjustable to apply to said other reel a stronger and a weaker braking force, said regulating means comprising means for adjusting said second braking means so that the latter applies to said other reel said stronger braking force in response to termination of rotation of said one reel at said higher speed.

11. A combination as defined in claim 10, wherein said braking means are disposed mirror symmetrically to each other with reference to a plane extending between said reels.

12. A combination as defined in claim 10, wherein each of said braking means comprises movable scanning means engaging the tape between said reels, biasing means for urging the respective scanning means against the tape, and at least one adjustable braking element movable into stronger and weaker frictional engagement with the corresponding reel in response to movements of the respective scanning means under and against the action of said biasing means, said regulating means comprising tensioning means having a first portion arranged to assist the biasing means of the braking means for said one reel in response to termination of rotation of said other reel at said higher speed and a second portion arranged to assist the biasing means of said second braking means in response to termination of rotation of said one reel at said higher speed.

13. A combination as defined in claim 12, wherein said tensioning means is movable from a neutral position to first and second operative positions in which said first and second portions thereof respectively assist the biasing means of said first and said second braking means, and further comprising first actuating means movable between first and second positions to thereby respectively start and arrest said first drive means, first shifting means for moving said tensioning means to said first operative position in response to movement of said first actuating means from said first to said second position, second actuating means movable between first and second positions to thereby respectively start and arrest said second drive means, and second shifting means for moving said tensioning means to said second operative position in response to movement of said second actuating means from said first to said second position.

14. A combination as defined in claim 13, further comprising means for biasing said tensioning means to said neutral position.

15. A combination as defined in claim 14, wherein said tensioning means further comprises a reciprocable carrier for said positions, said carrier having a projection and said means for biasing said tensioning means to said neutral position comprising a torsion spring having two legs which flank said projection.

* * * * *